United States Patent
Guevara et al.

(10) Patent No.: US 9,767,410 B1
(45) Date of Patent: Sep. 19, 2017

(54) RANK-CONSTRAINED NEURAL NETWORKS

(71) Applicant: Google Inc., Mountain View, CA (US)

(72) Inventors: Raziel Alvarez Guevara, Menlo Park, CA (US); Preetum Nakkiran, Redmond, WA (US)

(73) Assignee: Google Inc., Mountain View, CA (US)

( * ) Notice: Subject to any disclaimer, the term of this patent is extended or adjusted under 35 U.S.C. 154(b) by 192 days.

(21) Appl. No.: 14/739,335

(22) Filed: Jun. 15, 2015

Related U.S. Application Data

(60) Provisional application No. 62/059,545, filed on Oct. 3, 2014.

(51) Int. Cl.
*G10L 15/16* (2006.01)
*G06N 3/08* (2006.01)

(52) U.S. Cl.
CPC .............. *G06N 3/08* (2013.01); *G10L 15/16* (2013.01)

(58) Field of Classification Search
CPC .... G06F 3/04883; G06K 9/52; G10L 15/1815
USPC ............................................ 704/202; 706/20
See application file for complete search history.

(56) References Cited

U.S. PATENT DOCUMENTS

| | | | | |
|---|---|---|---|---|
| 5,572,628 | A * | 11/1996 | Denker ................... | G06K 9/52 706/20 |
| 5,583,968 | A | 12/1996 | Trompf | |
| 6,907,398 | B2 | 6/2005 | Hoege | |
| 2009/0006292 | A1 * | 1/2009 | Block ................. | G06F 3/04883 706/20 |
| 2014/0278379 | A1 * | 9/2014 | Coccaro ............. | G10L 15/1815 704/202 |

OTHER PUBLICATIONS

Alexa et al., "Lossless Data Compression Using Neural Networks," Proceedings of the 7th WSEAS International Conference on Circuits, Systems, Electronics, Control and Signal Processing (CSECS'08), pp. 128-132, 2008.
Chen et al., "Compressing Neural Networks with the Hashing Trick," arXiv:1504.04788v1 [cs.LG], Apr. 2015, 10 pages.
Chen et al., "Small-footprint keyword spotting using deep neural networks," in Proceedings of IEEE International conference on Acoustics, Speech and Signal Processing (ICASSP), pp. 4087-4091, May 2014.

(Continued)

*Primary Examiner* — Huyen Vo
(74) *Attorney, Agent, or Firm* — Fish & Richardson P.C.

(57) ABSTRACT

This specification describes, among other things, a computer-implemented method. The method can include training a baseline neural network using a first set of training data. For each node in a subset of interconnected nodes in the baseline neural network, a rank-k approximation of a filter for the node can be computed. A subset of nodes in a rank-constrained neural network can then be initialized with the rank-k approximations of the filters from the baseline neural network. The subset of nodes in the rank-constrained neural network can correspond to the subset of nodes in the baseline neural network. After initializing, the rank-constrained neural network can be trained using a second set of training data while maintaining a rank-k filter topology for the subset of nodes in the rank-constrained neural network.

20 Claims, 9 Drawing Sheets

(56) References Cited

OTHER PUBLICATIONS

Dahl et al., "Context-dependent pretrained deep neural networks for large-vocabulary speech recognition," IEEE Transactions on Audio, Speech, and Language Processing, vol. 20, No. 1, pp. 30-42, Jan. 2012.

Dahl et al., "Improving deep neural networks for LVCSR using rectified linear units and dropout," in Proceedings of IEEE International Conference on Acoustics, Speech, and Signal Processing (ICASSP), pp. 8609-8613, May 2013.

Dean et al., "Large scale distributed deep networks," in Proceedings of Advances in Neural Information Processing Systems (NIPS), 2012, pp. 1223-1231.

Deng and Yu, "Deep learning: Methods and applications," Foundations and Trends in Signal Processing, vol. 7, No. 3-4, pp. 197-387, Jun. 2014.

Deng et al., "New types of deep neural network learning for speech recognition and related applications: An overview," in Proceedings of IEEE International Conference on Acoustics, Speech, and Signal Processing (ICASSP), pp. 8599-8602, May 2013.

Grézl and Fousek, "Optimizing bottle-neck features for LVCSR," in Proceedings of IEEE International Conference on Acoustics, Speech and Signal Processing (ICASSP), pp. 4729-4732, Apr. 2008.

Hinton et al., "Deep neural networks for acoustic modeling in speech recognition: The shared views of four research groups," Signal Processing Magazine, IEEE, vol. 29, No. 6, pp. 82-97, Nov. 2012.

Jaderberg et al., "Speeding up convolutional neural networks with low rank expansions," arXiv preprint arXiv:1405.3866, pp. 1-12, May 2014.

Jaitly et al., "Application of pretrained deep neural networks to large vocabulary speech recognition," in Proceedings of Annual Conference of the International Speech Communication Association (INTERSPEECH), pp. 2578-2581, Mar. 2012.

LeCun et al., "Optimal brain damage," Proceedings of Advances in Neural Information Processing Systems (NIPS), vol. 2, pp. 598-605, 1990.

Lei et al., "Accurate and compact large vocabulary speech recognition on mobile devices," in Proceedings of Annual Conference of the International Speech Communication Association (INTERSPEECH), pp. 662-665, Aug. 2013.

Mamalet and Garcia, "Simplifying ConvNets for fast learning," in Proceedings of International Conference on Artificial Neural Networks (ICANN), 2012, pp. 58-65.

Nair and Hinton, "Rectified linear units improve restricted Boltzmann machines," in Proceedings of International Conference on Machine Learning (ICML), 2010, pp. 807-814.

Nakkiran et al., "Compressing Deep Neural Networks using a Rank-Constrained Topology," Proceedings of Annual Conference of the International Speech Communication Association, pp. 1473-1477, 2015.

Prabhavalkar et al., "Automatic gain control and multi-style training for robust small-footprint keyword spotting with deep neural networks," in Proceedings of IEEE International Conference on Acoustics, Speech and Signal Processing (ICASSP), pp. 4704-4708, Apr. 2015.

Rigamonti et al., "Learning separable filters," in Proceedings of IEEE Conference on Computer Vision and Pattern Recognition (CVPR), pp. 2754-2761, Jun. 2013.

Sainath et al., "Auto-encoder bottleneck features using deep belief networks," in Proceedings of IEEE International Conference on Acoustics, Speech, and Signal Processing (ICASSP), pp. 4153-4156, Mar. 2012.

Sainath et al., "Low-Rank Matrix Factorization for Deep Neural Network Training with High-Dimensional Output Targets," in Proceedings of IEEE International Conference on Acoustics, Speech, and Signal Processing (ICASSP), pp. 6655-6659, May 2013.

Seide et al., "Conversational speech transcription using context-dependent deep neural networks," in Proceedings of Annual Conference of the International Speech Communication Association (INTERSPEECH), pp. 437-440, Aug. 2011.

Treitel and Shanks, "The design of multistage separable planar filters," IEEE Transactions on Geoscience Electronics, vol. 9, No. 1, pp. 10-27, Jan. 1971.

Zeiler et al., "On rectified linear units for speech processing," in Proceedings of IEEE International Conference on Acoustics, Speech and Signal Processing (ICASSP), pp. 3517-3521, May 2013.

\* cited by examiner

|  | Current Baseline | New Rank 5 Topology |
|---|---|---|
| First Layer | 40*41 + 1 =<br>1641 parameters per node | 5*(40+41) + 1 =<br>406 parameters per node<br>(25% original) |
| Overall | (1641 * 128)<br>+ (129 * 128)<br>+ (129 * 128)<br>+ (129*3) =<br>243,459 total parameters | (406 * 128)<br>+ (129 * 128)<br>+ (129 * 128)<br>+ (129*3) =<br>85,379 total parameters<br>(35% original) |

FIG. 7

RANK-CONSTRAINED NEURAL NETWORKS

CROSS-REFERENCE TO RELATED APPLICATIONS

This application claims priority to U.S. Provisional Application Ser. No. 62/059,545, filed on Oct. 3, 2014, the entire contents of which are hereby incorporated by reference.

TECHNICAL FIELD

This specification generally relates to artificial neural networks.

BACKGROUND

Deep neural networks (DNNs) have recently emerged as an attractive solution for many learning problems. DNNs can offer great representational power, without demanding much feature engineering. Computational advances and the availability of large datasets have made it feasible to train large DNNs, with millions of parameters.

SUMMARY

This specification generally describes an approach to reducing the model size of feed-forward Deep Neural Networks (DNNs). In some implementations, the approach can be applied to feed-forward DNNs where the input layer is dominant and the input features have a natural 2-dimensional structure, such as occurs in the stacking of temporal feature vectors. For example, a rank-constrained neural network topology is described that factors the first layer of a DNN to follow the 2-dimensional structure of the input and enforces a low-rank approximation of the weights. The techniques discussed in this specification may apply to a range of DNNs applied in different contexts. One such context includes keyword spotting in an automatic speech recognizer. DNNs for keyword spotting systems may require a small-footprint model to make them feasible for application in resource constrained environments, such as mobile devices that lack the amount of memory required for very large DNNs. Some experiments have shown, for example, that the techniques described in this paper have resulted in a 65% reduction in the size of a rank-constrained neural network as compared to the original DNN model size, without a significant impact on performance. Experiments have also shown a 75% reduction in size of the first layer of the DNN using a Rank-5 approximation of the weights, again without significant impact on performance. Even further reduction would be expected if lower-rank approximations were used.

Some implementations include a computer-implemented method. The method can include obtaining a first set of training data for training a baseline neural network. The baseline neural network can be trained using the first set of training data. When trained, the baseline neural network can have a plurality of interconnected nodes, wherein each of the nodes has one or more weight values that characterize a filter for the node. For each node in a subset of the interconnected nodes in the baseline neural network, a rank-k approximation of the filter for the node can be computed. A second set of training data for training a rank-constrained neural network can be obtained, and a subset of nodes in the rank-constrained neural network can be initialized with the rank-k approximations of the filters from the baseline neural network. The subset of nodes in the rank-constrained neural network can correspond to the subset of the interconnected nodes in the baseline neural network. After initializing the subset of nodes in the rank-constrained neural network with the rank-k approximations of the filters, the rank-constrained neural network can be trained using the second set of training data while maintaining a rank-k filter topology for the subset of nodes in the rank-constrained neural network.

These and other implementations can optionally include one or more of the following features.

The subset of the interconnected nodes in the baseline neural network can include nodes in a first hidden layer of the baseline neural network, to the exclusion of other nodes outside of the first hidden layer of the baseline neural network. The subset of nodes in the rank-constrained neural network can include initializing nodes in a first hidden layer of the rank-constrained neural network with the rank-k approximations of the filters from the baseline neural network, to the exclusion of other nodes outside the first hidden layer of the rank-constrained neural network.

For at least one node in the subset of the interconnected nodes in the base line neural network, computing the rank-k approximation of the filter for the node can include performing a single value decomposition on a weight vector of the filter.

Performing the singular value decomposition on the weight vector of the filter can include wrapping the weight vector into a matrix.

The second set of training data can include all or some of the training data from the first set of training data.

The method can further include performing automatic speech recognition tasks with the trained rank-constrained neural network. The automatic speech recognition tasks can be performed by predicting likelihoods that input audio signals correspond to one or more words, or portions of a word, in a language.

Performing the automatic speech recognition tasks with the trained rank-constrained neural network can include predicting likelihoods that the input audio signals correspond to one or more pre-defined keywords, or portions of a keyword, in the language. The rank-constrained neural network can be implemented in a keyword spotting system.

At least one of the first set of training data and second set of training data can include audio samples, each audio sample indicating, for each of n time frames, a level of an audio signal for each of m frequency channels during the time frame.

Each audio sample can be capable of being visually represented by a two-dimensional spectrogram.

Each sample of training data in the first set of training data and the in the second set of training data can include a plurality of values, the values of each sample of training data being arranged in an m×n array.

Each node in the subset of the interconnected nodes in the baseline neural network can have a number of weight values that equals the product of m and n, or that equals the product of m and n plus one.

Each node in the subset of nodes in the trained rank-constrained neural network can have a number of weight values that equals the sum of m and n, or that equals the sum of m and n plus one.

Computing the rank-k approximation of the filters can include computing a rank-1 approximation of the filters.

The method can further include performing image processing tasks with the trained rank-constrained neural network.

In some implementations, one or more computer-readable storage media are provided, which may be non-transitory. The storage media can store instructions that, when executed by one or more processors, cause operations to be performed. The operations can include obtaining a first set of training data for training a baseline neural network; training the baseline neural network using the first set of training data, the baseline neural network comprising a plurality of interconnected nodes, wherein each of the nodes comprises one or more weight values that characterize a filter for the node; for each node in a subset of the interconnected nodes in the baseline neural network, computing a rank-k approximation of the filter for the node; obtaining a second set of training data for training a rank-constrained neural network; initializing a subset of nodes in the rank-constrained neural network with the rank-k approximations of the filters from the baseline neural network, the subset of nodes in the rank-constrained neural network corresponding to the subset of the interconnected nodes in the baseline neural network; and after initializing the subset of nodes in the rank-constrained neural network with the rank-k approximations of the filters, training the rank-constrained neural network using the second set of training data while maintaining a rank-k filter topology for the subset of nodes in the rank-constrained neural network.

Some implementations can include a computing system that includes one or more computers and one or more computer-readable media having instructions stored thereon that, when executed by the one or more computers, cause operations to be performed that include: obtaining a first set of training data for training a baseline neural network; training the baseline neural network using the first set of training data, the baseline neural network comprising a plurality of interconnected nodes, wherein each of the nodes comprises one or more weight values that characterize a filter for the node; for each node in a subset of the interconnected nodes in the baseline neural network, computing a rank-k approximation of the filter for the node; obtaining a second set of training data for training a rank-constrained neural network; initializing a subset of nodes in the rank-constrained neural network with the rank-k approximations of the filters from the baseline neural network, the subset of nodes in the rank-constrained neural network corresponding to the subset of the interconnected nodes in the baseline neural network; and after initializing the subset of nodes in the rank-constrained neural network with the rank-k approximations of the filters, training the rank-constrained neural network using the second set of training data while maintaining a rank-k filter topology for the subset of nodes in the rank-constrained neural network.

In some implementations, rank-constrained neural networks that are generated consistent with the techniques described in this paper may exhibit none, one, or more of the following advantages. In some implementations, the rank-constrained neural network (RCNN) may have substantially fewer parameters than its baseline counterpart, thereby making the rank-constrained network more suitable for use in a memory-constrained (or otherwise resource-constrained) environment. Moreover, RCNNs can encompass (and can be more powerful than) several naive approaches to reducing model size, such as manually reducing the input size by averaging in time or frequency. Indeed, RCNNs can allow averaging across both time and frequency, and can be more data-driven—only making the experimentally-validated assumption of low-rank. RCNNs can have reduced model-complexity, which may help prevent overfitting.

Moreover, upon inspection, learned low-rank filters can be significantly smoother than their baseline counterparts. These simpler, smoother filters may be less sensitive to noise, and hence improve noise-robustness overall (for example, RCNN filters may be deployed in domains such as hotword detection/keyword spotting where the signal is relatively simple, but the noise is relatively complex). In some implementations, the low-rank approach described in this specification can realize advantages over other techniques for compressing neural networks, such as the linear "bottleneck-layer" approach, even while achieving better levels of performance. For example, bottleneck layers may force the entire transfer function across layers to be "simple" (in the low-rank sense), while RCNNs may only constrain filters to be individually "simple."

BRIEF DESCRIPTION OF THE DRAWINGS

FIG. 7 shows a table comparing the relative sizes of an example baseline deep neural network and a rank-constrained neural network equivalent with rank-5 constrained topology.

DETAILED DESCRIPTION

Figure 1:
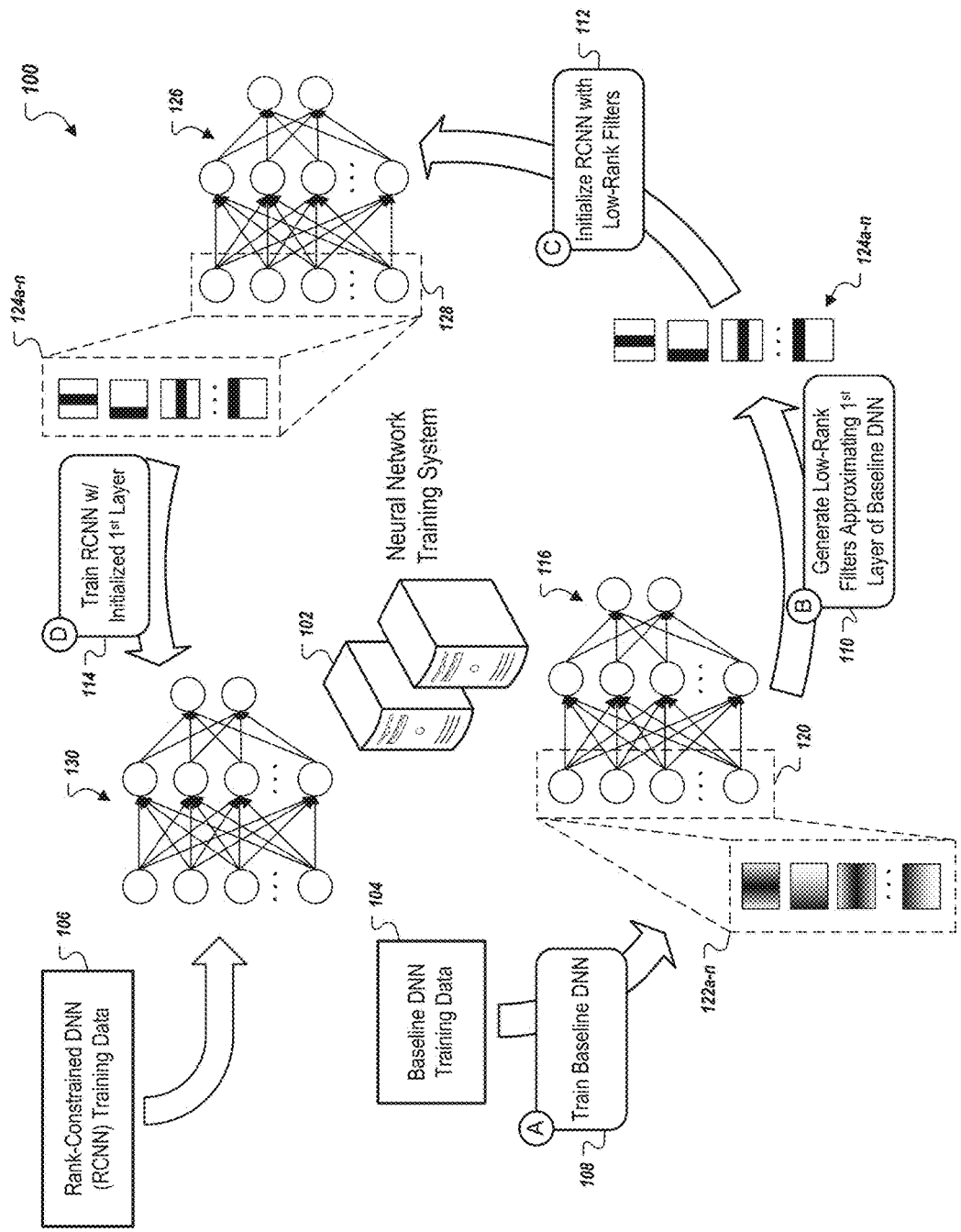
FIG. 1 depicts a conceptual diagram of an example process 100 for generating a rank-constrained neural network using a neural network training system.

Neural networks, including deep neural networks (DNNs), can be used in computing systems in various applications. For example, the powerful learning capabilities of DNNs make them well-suited for automatic speech recognition (ASR) systems. In some implementations, DNNs can be employed in large vocabulary continuous speech recognition (LVCSR) systems. In some implementations, DNNs can be employed in keyword spotting (KWS) systems, as discussed in greater detail below. However, in some cases, the generality and broad applicability of DNNs is achieved at the cost of computational overhead. The amount of memory required to store DNN parameters can be substantial, and can dwarf the memory requirements of other techniques. Therefore, this specification describes an approach to reducing the model size of DNNs so as to enhance their suitability in resource constrained environments, such as mobile devices, where memory and other computing resources are limited.

When applied in keyword spotting systems (KWS), DNNs can be used to process raw audio features and output posterior probabilities for units of a keyword (e.g., words or syllables), which can be further processed to complete the recognition of the keyword. However, such DNN architectures sometimes require that enough temporal context is provided to the DNN for the input features to be meaningful. In order to provide the requisite temporal context, input features can be computed for a unit of time, as a vector, and then multiple feature vectors can be stacked together to serve as the input to the DNN. This approach, however, can result in a considerable growth in size of the input layer of the DNN, which can be compounded by the complexity of the network's topology. Consequently, techniques to compress such DNNs can be important in order to make the DNNs usable, for example, in embedded systems that aim to perform detection in memory-constrained hardware environments.

In this specification, techniques are described for training a DNN in a manner that utilizes low-rank filters so as to limit the number of parameters in the DNN, thereby making the DNN more suitable for use in resource-limited environments. For example, these techniques may be applicable when the input layer of the DNN is dominant, and has a natural 2-dimensional structure (e.g., time and frequency for audio signals). In such cases, nodes in the input layer of a non-rank constrained DNN may have a large number of parameters, and a substantial portion of the overall number of parameters in the non-rank constrained DNN may be found in the input layer of the DNN. Nonetheless, individual nodes in the first layer sometimes have simple (low-rank) dependence on the input. As such, existing DNNs can be compressed using low-rank approximations of individual node weight-vectors by means of a neural network architecture that this specification refers to as a rank-constrained neural network (RCNN). In some implementations, low-rank filters can be directly encoded into the topology of the RCNN itself while training the RCNN, by initializing one or more layers of the RCNN with low-rank approximations of filters from a baseline (non-rank constrained) DNN before training the RCNN.

FIG. 1 depicts a conceptual diagram of an example process 100 for generating a rank-constrained neural network. The rank-constrained neural network generated by process 100 may have a much smaller footprint (i.e., smaller size and reduced number of parameters) than a baseline neural network that lacks the rank-constraints imposed on the RCNN, without a significant performance gap between the RCNN and the baseline neural network. In some implementations, the process 100 can be performed by a computing system having one or more computers, such as neural network training system 102.

The process 100 begins at stage A (108), where a baseline, feedforward DNN is trained using baseline DNN training data 104. The baseline training data 104 may be comprised of many samples of input data that represent the type of data the DNN would be expected to receive at runtime. The baseline DNN may be trained using supervised or unsupervised techniques. For supervised learning, the input samples in the training data 104 may be pre-labeled with their desired outputs, thereby allowing the baseline DNN to adjust its weight vectors to yield the desired output. In some implementations, the input samples may be hand-labeled by one or more users. For example, where the neural network is to be used for keyword spotting in a speech recognizer, the input samples may be raw audio features, or may be derived from raw audio features. Each sample may be labeled with the spoken word, phrase, or portion of a word, for example, which is represented by the sample. Thus, some input audio samples may be labeled with the outputs "open," "play," "e-mail," or other keywords.

For optimal performance, the input audio samples can each include sufficient temporal context for the input features to be meaningful. Accordingly, the features in each sample may be computed for a period of time, as a vector, and then multiple feature vectors may be stacked together to serve as the input to the DNN. For example, the input samples may be represented as a 2-dimensional structure in which a signal level is indicated for each of m frequency channels at each of n time frames spanning the period of time represented by the sample.

At the completion of stage A (108), a trained baseline DNN 116 is generated. The baseline DNN 116 is configured to process input samples, such as raw audio features, and to output posterior probabilities for different output conditions, such as the probabilities that input audio corresponds to a keyword or a portion of a keyword.

The baseline DNN 116 may have a plurality of interconnected nodes, which are organized as a sequence of layers. Each node may filter its input signals, and propagate signals to other nodes in the DNN 116 in feedforward fashion according to an activation function. The filter, or activation function, of each node may be defined by a series of weight values. The weight values may be stored as respective weight vectors for each node, which generally control how input signals to a node are processed and whether and how output signals are propagated forward to other nodes in the network 116.

As noted, the nodes of the baseline DNN 116 may be arranged as layers. For example, an input layer of nodes may be provided to process the input signals to the DNN 116 (not shown in FIG. 1). One, two, three, or more hidden layers may then be provided successively. The first hidden layer 120, which would be connected to the input layer, is represented by the leftmost column of baseline DNN 116. The output of the first hidden layer 120 is fed to a second hidden layer, which is represented by the second column from the left in the baseline DNN 116. The second hidden layer is connected to the pair of nodes in the rightmost column of baseline DNN 116, which forms an output layer of the DNN 116. The baseline DNN 116 could be structured with additional hidden layers, although only two are shown in the figure for simplicity. For example, a baseline hotword-DNN that has been trained with audio feature samples having m=40 frequency channels over n=41 time frames may have three fully connected ReLU (Rectified Linear Units) hidden layers with 128 nodes each, and one 3-output softmax layer for classifying the input audio as, for example, "ok," "Google," or other. Each of the hidden layers may have 128 nodes. The first hidden layer may have 1641 parameters (weights), which is the product of the m=40 frequency channels and n=41 time frames plus one. The other hidden layers may also have 128 nodes each, but may have significantly fewer parameters per node than the nodes in the first hidden layer.

Figure 2:
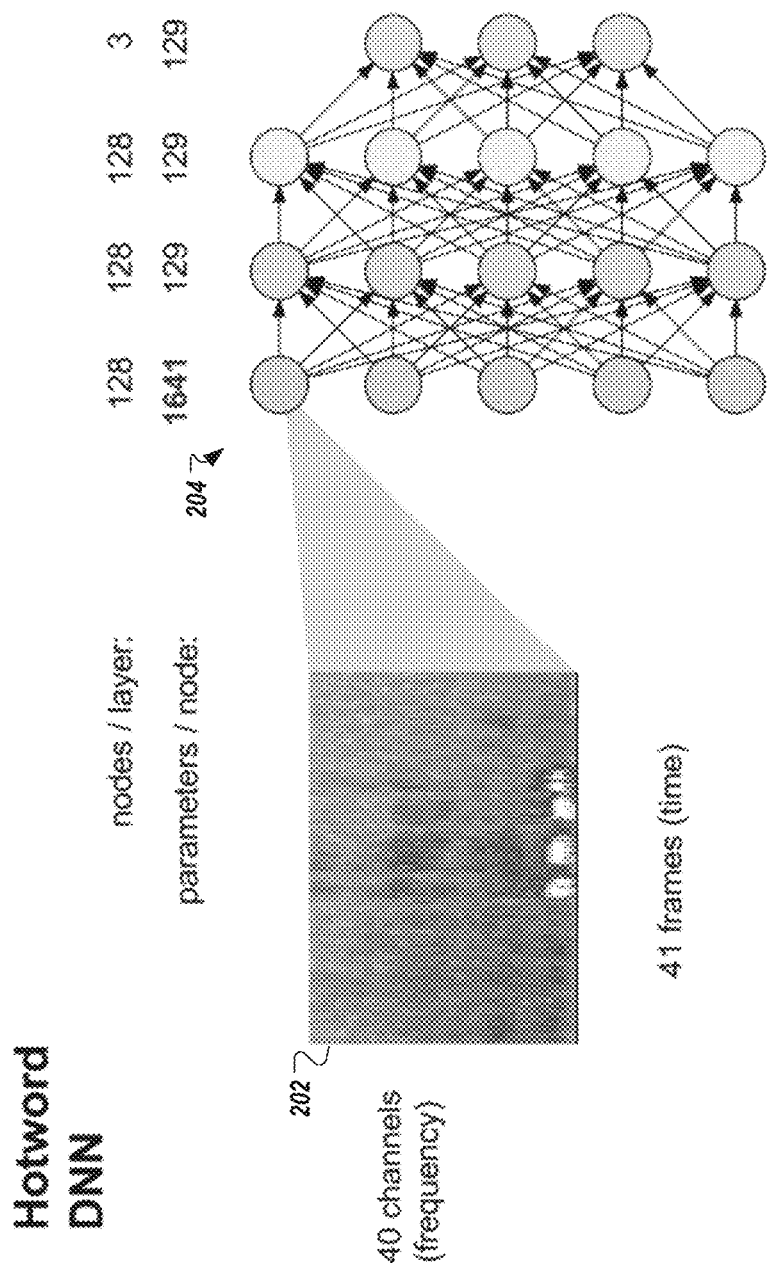
FIG. 2 shows an example representation of a baseline implementation of a deep neural network (DNN) configured to be employed in a hotword detector (i.e., a keyword spotter).

Visual representations of the nodes in the first hidden layer 120 are shown as filters 122a-n in the magnified region to the left of the baseline DNN 116. Each of the filters 122a-n corresponds to a single node in the first hidden layer 120 of the baseline DNN 116. The filters are shown as imperfect gradients that indicate how the filters would process the audio features from an input signal. The 2-dimensional visualization of the filter is provided to match the 2-dimensional characterization of an input signal, such as the time/frequency features in the spectrogram of an audio sample (a spectrogram 202 of an audio signal is shown in FIG. 2 for context). Intensely black or white regions of the filters 122a-n indicate which regions of the spectrogram strongly influence a particular node. The visual representations of the filters 122a-n show that many of the filters are highly structured. Even though the weights of the baseline DNN 116 may have been initialized arbitrarily, the training process 108 (e.g., using backpropagation techniques) resulted in filters in the first hidden layer 120 that exhibit a substantial amount of structure. For example, the dark region in the top filter is generally vertical, whereas the dark region in the filter that is third from the top in the magnified region is generally horizontal. The structure may indicate activity across frequencies, at a particular time, for example, or activity in a narrow range of frequencies for the duration of time represented by the input signal.

At stage B (110), the computing system 102 generates a set of low-rank filters 124a-n that approximate the filters 122a-n from the first hidden layer of the baseline DNN 116. The low-rank filters 124a-n generally maintain the natural structure of the originally trained filters 122a-n, but are "compressed," so that far fewer parameters (weights) are needed to characterize the structures of each filter 122 in the first hidden layer 120. In some implementations for two-dimensional input features, the number of parameters in the weight vector for each filter in the first hidden layer 120 can be reduced from m*n parameters (or m*n+1 parameters), to just m+n parameters. For example, given audio inputs that have a total of about 1640 parameters (41 time frames*40 frequency channels), the number of weights per node in the first hidden layer can be reduced from about 1640 to just 81 (i.e., from 40*41 to 40+41). This can be accomplished in some implementations by taking the rank-1 approximation of each filter's weight vector 122a-n from the first layer 120 of the baseline DNN 116. The visual representations of the rank-1 filters 124a-n show that the structures of the respective filters 122a-n are largely maintained, but are specified by far fewer parameters. Because most of the structure in the baseline filters 122a-n has rank-1 dependence, the low-rank filter approximations 124a-n can achieve very similar performance as the baseline filters 122a-n, albeit with a much smaller footprint.

In some implementations, the low-rank filters 124a-n can be computed for each node by performing singular value decomposition (SVD) on the weight vector for the node for the node 122 from the baseline DNN. The weight vector may be wrapped into a matrix, matching the input dimensions of the input signals. For example, for audio signals having 2-dimensional structure, the weight vector may be wrapped into a 2d-matrix when performing the SVD. However, similar techniques can be applied in some implementations for other types of input signals in other dimensions. For example, the neural network may be configured to process 3-dimensional input, in which case the weight vectors in the network would be wrapped in three dimensions to perform the singular value decomposition. In some implementations, the low-rank filters 124a-n can be generated by factoring the baseline filters 122a-n, and introducing an intermediate layer. Audio inputs, for example, may have their individual features multiplied first by their frequency index, and then by their time index at each node. Such factoring may result in the need for just m+n parameters for each node, rather than m*n parameters.

In some implementations (not illustrated in FIG. 1), the process 100 may generate a compressed DNN by replacing the baseline filters 122a-n in the baseline DNN 116 with the set of low-rank filters 124a-n, without modifying either the weights or topology of other nodes in the baseline DNN 116. For example, the first hidden layer 120 of nodes in the baseline DNN 116 can be substituted with their corresponding low-rank filters 124a-n without disturbing the nodes in the other hidden layers. Experimental results have shown that overwriting filters in this manner in a trained hotword-DNN (i.e., in the baseline DNN 116) with their low-rank approximations yields reasonable performance, even without further fine-tuning Nonetheless, it can be further beneficial to allow the network to learn low-rank filters naturally, which can improve stability and performance of the network. Stages C and D (112 and 114) of FIG. 1 illustrate how this can be achieved. The resulting network 130 generated according to these techniques is referred to in this specification as a rank-constrained neural network (RCNN).

At stage C (112), the computing system 102 begins with a topology for an un-trained neural network 126 similar to that of the baseline neural network 116 (e.g., 3 hidden layers with 128 nodes per layer), and initializes the first hidden layer 128 of the network 126 with the low-rank filter approximations 124a-n. In this way, the nodes in the first layer 128 are initially given a low-rank topology, and are assigned weights that have been determined to be low-rank equivalents of the filters 122a-n from the baseline DNN 116. The weights for the other nodes (e.g., hidden nodes outside the first layer) may be assigned random or otherwise arbitrary initial values. In some implementations, the weights for the other nodes may be assigned the same values initially as the weights for the corresponding nodes in the trained, baseline DNN 116.

At stage D (114), a rank-constrained neural network 130 is trained. The training begins with the initialized first layer 128 having low-rank filters 124a-n, and then continues in a similar manner as the training of the baseline neural network 116 occurred at stage A (108). The RCNN 130 can be trained with a set of RCNN training data 106. The set of RCNN training data 106 may be the same set of training data 104 that was used to train the baseline DNN 116, or may be partially or completely different. For example, all or some of the training samples that were used in training the baseline DNN 116 may also be part of the training data 106 for training the RCNN 130.

In some implementations, the low-rank topology of the first hidden layer can be enforced throughout the training of the RCNN 130, so that the fully trained RCNN 130 has a low-rank structure in the first hidden layer. The first hidden layer of RCNN 130 can thus have a substantially fewer number of parameters per node than the number of parameters per node in the baseline DNN 116. The RCNN 130 may thus be suitable for use in a resource-constrained environment, such as a mobile device that has limited memory capabilities. In some implementations, the computing system 102 may allow the weights in the initialized first layer to be adjusted during training so that the final weights in the trained RCNN 130 are not the same as the weights from filters 124a-n. However, by initially seeding the first hidden layer 128 with low-rank weight vectors, the training of the RCNN 130 at stage D (114) can bias the training toward the pre-determined low rank structure of the input, and allow a low-rank topology for the filters to be maintained. In some implementations, the computing system 102 may lock-in the values of the weights in the initialized first layer so that they are prevented from changing while the computing system 102 trains the RCNN 130.

Although FIG. 1 has been described in terms of reducing the rank of nodes in a first hidden layer of a deep neural network, the techniques described in this specification may also be applied to reduce the rank of nodes in other layers as well (e.g., the second, third, fourth hidden layers). Depending on the nature of the input and the structure of the network, layers other than or in addition to the first hidden layer may possess or share a substantial portion of the overall number of parameters of the network. In such cases, low-rank approximations may be taken of the nodes in those other layers, and then used to initialize and train corresponding nodes in a rank-constrained neural network. In some implementations, the rank of nodes in multiple hidden layers may be reduced (e.g., determine low-rank approximations for nodes in both the 1st and 2nd hidden layers).

The discussion of FIGS. 2-7 in the following paragraphs will be further described with respect to a hotword detector (keyword spotting) DNN, by way of example.

FIG. 2 illustrates a baseline hotword-DNN 204. The DNN 204 in this example has 3 fully-connected ReLU hidden layers with 128 nodes each, and one 3-output softmax layer (classifying the input audio as, say, "ok", "google", or other). The first layer is fully-connected to the input, and comprises 86% of the total network size in terms of the number of parameters in the first layer relative to the number of parameters in the network as a whole.

The input to the hotword DNN 204 is audio whose samples are visually represented by a 2D spectrogram 202. The spectrogram 202, have values $x_{i,j}$, corresponding to audio at time i, frequency j. The audio samples may have, for example, 1640 audio features (40 frequency channels across 41 time frames) The time frames in each sample may include a mix of past, current, and future frames. For example, the window of time represented by each audio sample may include 1 current time frame, 30 past time frames, and 10 future time frames (total of 41 time frames).

For each node (m) in the first layer of the baseline DNN, the node's weight vector can be wrapped into a matrix $W^{(m)}$, where $W^{(m)}_{i,j}$ corresponds to its weight of input at time i, frequency j. Then, node m in the first layer of the baseline-DNN (with non-linearity f) computes:

$$f\left(\sum_{i,j} W^{(m)}_{i,h} x_{i,j}\right) \quad \text{Equation 1}$$

The first layer of the trained baseline DNN has significant structure (and hence, compressibility), which is revealed in the weight vectors of individual nodes ("filters").

Figure 3:
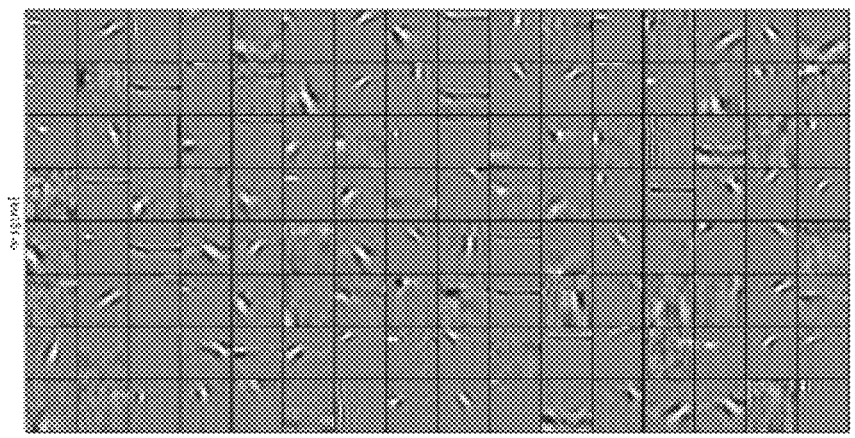
FIG. 3 is a graphical representation of 128 filters from the baseline-DNN of FIG. 2. Each square represents the weight vector of a filter, wrapped such that time and frequency are horizontal and vertical, respectively.

FIG. 3 is a graphical representation of the 128 filters from first hidden layer of the baseline-DNN of FIG. 2. Each square in the grid 300 represents the weight vector of an individual filter, wrapped such that time and frequency are horizontal and vertical, respectively. That is, each of the 128 squares in the grid 300 graphically represents an individual filter as a 2D image, by wrapping the node's weight vector into the matrix $W_{i,j}$ (matching the frequency and time dimensions of the input). The operation of each filter can be considered as overlaying its weights onto the input spectrogram of audio features for an input signal. Intensely black regions and intensely white regions correspond to regions of the input spectrogram that would be strongly influenced by a particular node. Notably, the filters in FIG. 3 can be seen as being highly structured—many of them are substantially vertical lines (corresponding to activity across frequencies, at a particular time), or have only relatively small patches of activity.

Figure 4:
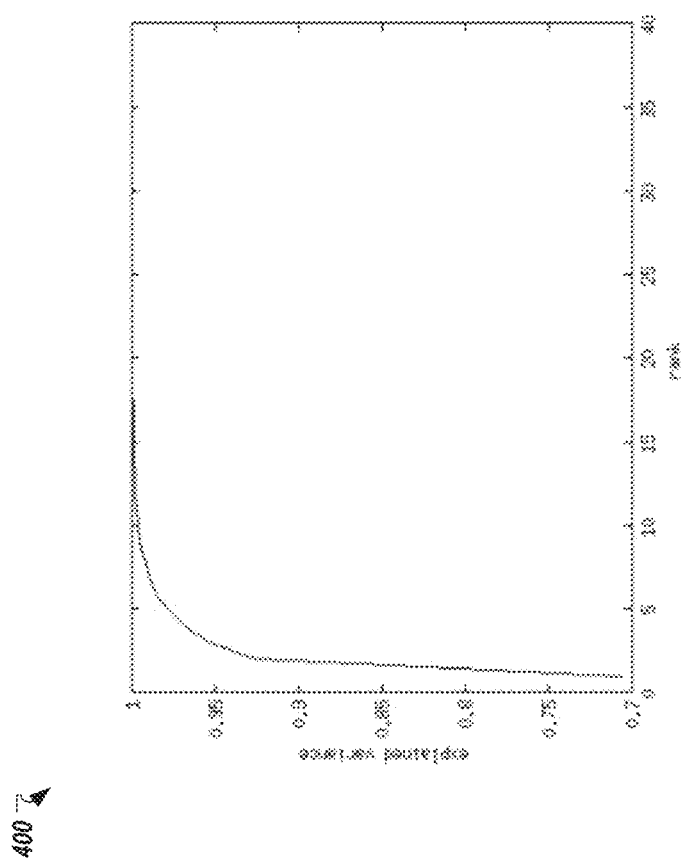
FIG. 4 is a plot that shows the explained variance of a baseline neural network as a function of its rank structure.

Each filter's weight-vector can be represented as a matrix, and can be compressed by taking a low-rank approximation of the vector. Weight-matrices may have natural low-rank structure, because many features may be either local, or may not vary widely across both time and frequency (for example, the vertical line filters are nearly rank-1). FIG. 4 plots the explained variance of all the filters, confirming the low-rank structure: More than 97% of the total variance is explained by keeping just the first 5 singular values of each filter.

Further, Rank-1 filters can have a meaningful interpretation. In this case, an approximation can be made:

$$W_{i,j} \approx \alpha_i \beta_j \quad \text{Equation 2}$$

Equation 2 indicates that the filter W is a combination of some selectivity in time ($\alpha$) with some selectivity in frequency ($\beta$).

Experimental results have shown that overwriting filters in a trained hotword-DNN with their low-rank approximations can yield reasonable performance, even where the network was not permitted to fine-tune itself after overwriting and where learning low-rank filters in the baseline-DNN was not encouraged. In some implementations, desired performance may also be achieved by allowing the network to learn low-rank filters naturally, as described below.

The RCNN topology described in this paper in some implementations encodes the low-rank constraint of the first layer into the network itself. This allows the network to learn low-rank filters directly (instead of allowing it to learn arbitrary filters, then approximating them in low-rank).

Rank-1 filters can be equivalent to a particular first-layer topology, in some implementations. In the following paragraphs, this topology is generalized to filters of arbitrary rank.

Figure 5:
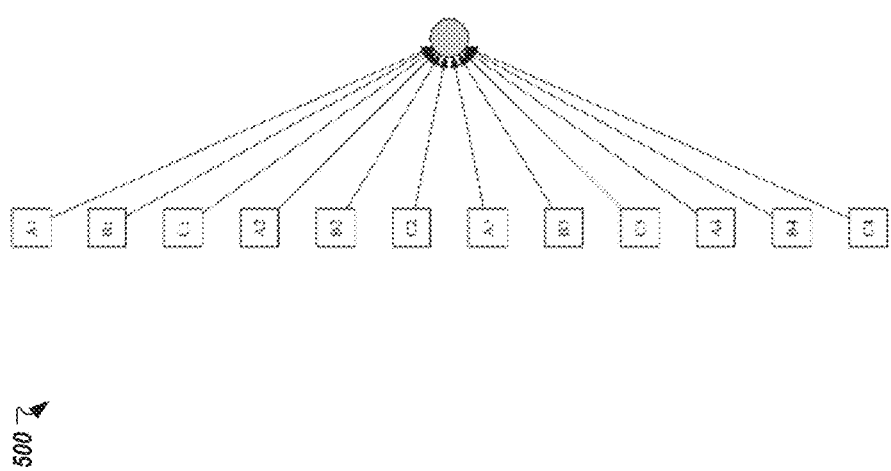
FIG. 5 shows a toy example of one filter in a baseline DNN in which the filter is directly connected to 12 input features.
Figure 6:
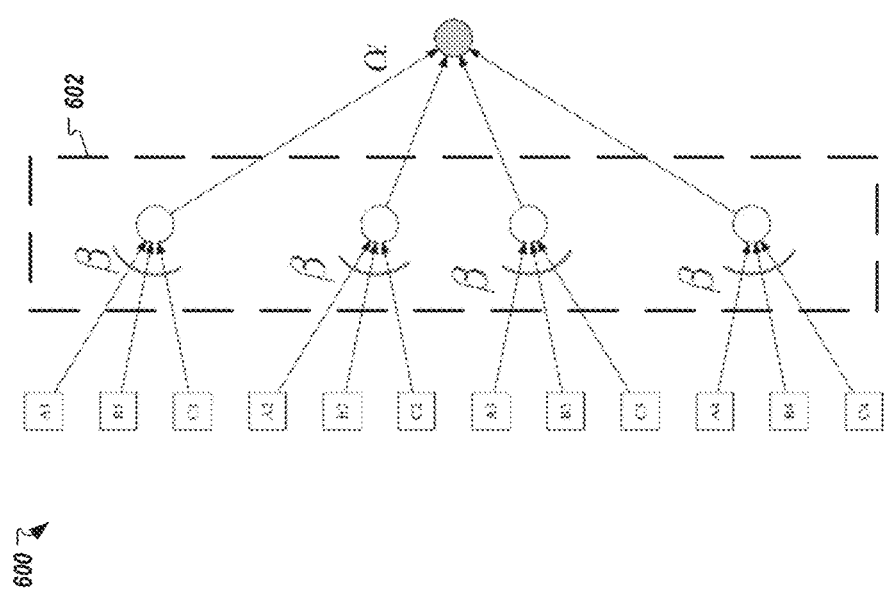
FIG. 6 shows a toy example of a filter in a rank-constrained neural network, where the dependence of the filter is factored by introducing an intermediate layer.

Consider a toy example, taking the input to be 3 frequency channels (A, B, C) across 4 time frames (1, 2, 3, 4). FIG. 5 shows one filter in the baseline network, connected directly to all of the input features. Notice that this arrangement requires 3*4=12 parameters, since the dependence is allowed to be arbitrary. FIG. 6 shows the same filter in a rank-constrained neural network 600, where the dependence is factored by introducing a linear intermediate layer 602. Here, inputs are first multiplied by weights corresponding to their frequency-index ($\beta$), and are then multiplied by weights corresponding to their time-index ($\alpha$). This approach requires just 3+4=7 parameters.

Mathematically, this approach is equivalent to factoring (1) using (2):

$$\sum_{i,j} W_{i,j} x_{i,j} \approx \sum_{i,j} \alpha_i \beta_j x_{i,j} = \sum_i \alpha_i \left(\sum_j \beta_j x_{i,j}\right) \quad \text{Equation 3}$$

In general, let the 2D input be size m×n, so each filter of the baseline-DNN has a mn-parameter weight-vector, wrapped into m×n matrix W. For each filter, the rank-1 first-layer topology (RCNN(1)) introduces a linear intermediate layer with n nodes, such that node i is connected to inputs $x_{i,j} \forall j$. These intermediate nodes have tied-weights, with m parameters $\beta_j$. Then the final RCNN(1) filter is connected to these n intermediate nodes, with weights $\alpha_i$, and retains the nonlinearity f of the original filter.

Now a direct equivalence is shown between rank-1 filters and rank-1 topologies, and can apply the SVD theorem to generalize to topologies of higher rank: Just as rank-k matrices are the sum of rank-1 matrices, rank-k filter topologies are the sum of rank-1 topologies.

For rank-2 filters, for example (Equation 5 is equal to the right-side of Equation 4):

$$\sum_{i,p} W_{i,j} x_{i,j} \approx \sum_{i,j} (\alpha_i \beta_j + \alpha'_i \beta'_j) x_{i,j} \qquad \text{Equation 4}$$

$$\sum_i \alpha_i \sum_j \beta_j x_{i,j} + \sum_i \alpha'_i \sum_j \beta'_j x_{i,j} \qquad \text{Equation 5}$$

Therefore, a rank-k topology for one filter can include k copies of the rank-1 topology, summed together. In practice, this sum can be equivalently performed by connecting all the linear intermediate layers (β, β', etc.) of the copies into the same final node, which then has kn parameters.

A general framework has been described for representing rank-k constrained filters, by the RCNN(k) neural-network topology. This topology reduces the parameter size per-filter from mn in the baseline-DNN to k(m+n) in the RCNN(k) topology. Further, since the rank-constraint is implicit in the topology itself, various DNN training methods can be employed to learn DNNs with naturally low-rank filters.

These techniques were experimentally evaluated by training RCNN topologies for keyword-spotting, and comparing their size and performance to the baseline hotword-DNN. An example training process can be performed as follows to generate an RCNN:

1. Train a baseline network (e.g., the hotword-DNN).
2. For each trained filter, perform an SVD on its weight vector (wrapped into a matrix, matching the input dimensions) to compute a rank-k approximation.
3. Construct an RCNN by modifying the first-layer to use a rank-k topology, as described above (while preserving the topology of later layers). Initialize the RCNN-layer (α, βs) with the top k singular vectors from the SVD. Initialize later layers with their weights from the original network.
4. Train the Rank-Constrained Neural Network, with the given initialization.

FIG. 7 shows a chart comparing, for example, the sizes of a rank-5 RCNN model to the baseline model. The RCNN topology is shown to reduce the size of the first layer by 75%, which reduces the total model size by 65%. Rank-constrained neural networks can achieve equivalent or better recognition performance as fully-connected DNNs, with a smaller memory footprint.

Figure 8:
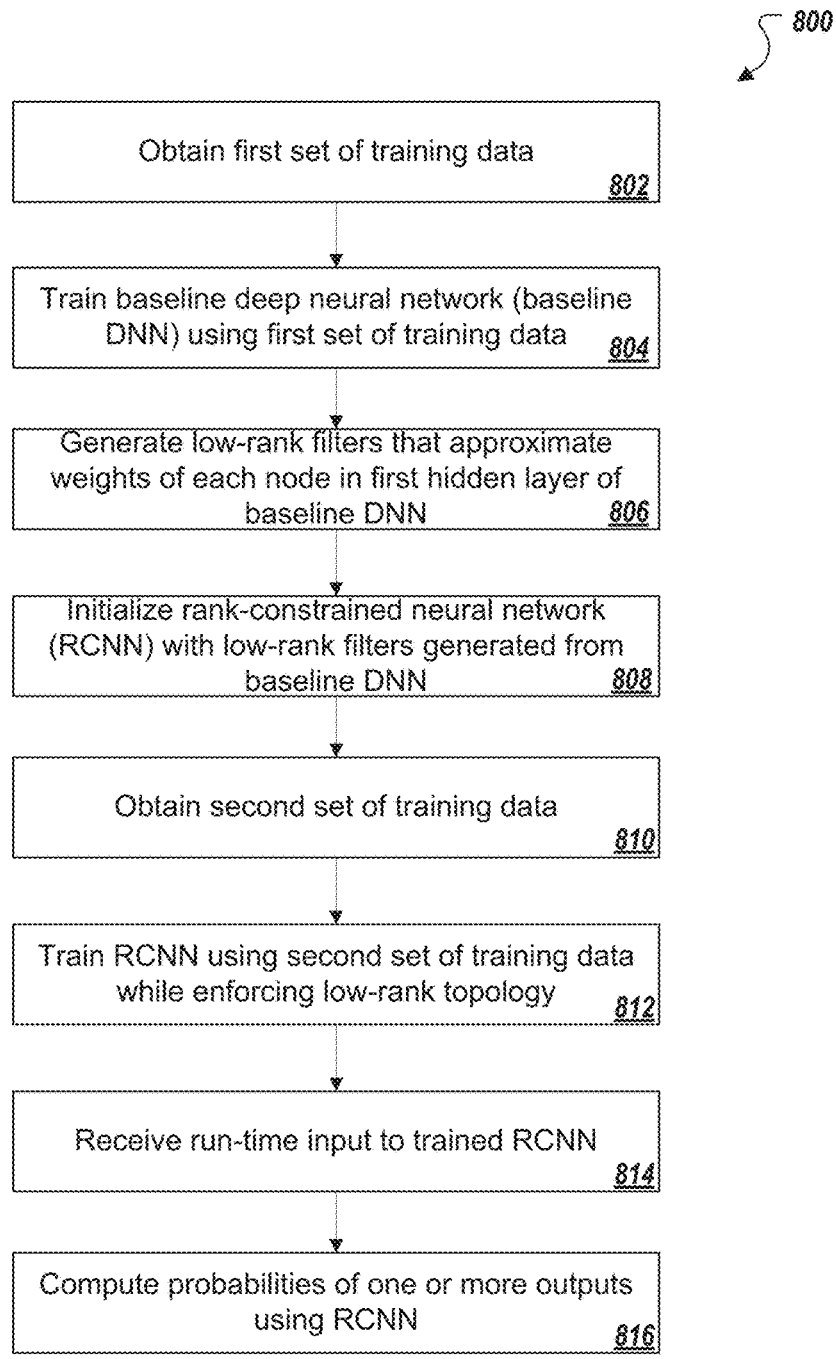
FIG. 8 depicts a flowchart of an example process for generating a rank-constrained neural network.

Referring to FIG. 8, a flowchart is shown of an example process 800 for training a rank-constrained neural network. In some implementations, the process 800 can be carried out by a system of one or more computers, such as the neural network training system 102, depicted in FIG. 1.

The process 800 can begin at stage 802, where a first set of training data is obtained. The training data may be any type of data depending on the application of the neural network that is to be trained. For example, a neural network that is to be used in a speech recognition system may be trained with raw audio samples. Each sample may have a plurality of features, and each feature may indicate a signal level for a particular frequency channel at a particular time frame. Other types of training data may also be employed when the neural network is to be implemented in other contexts. For example, the training data may be sample images when the neural network is being trained for use in image recognition. For a language model, the samples of training data may be strings of text, as another example.

At stage 804, the process 800 trains a baseline deep neural network using the first set of training data. The training data 804 may be pre-labeled, so that the baseline deep neural network can be iteratively trained. The network can then predict one or more output conditions in response to an input signal. The baseline deep neural network may be trained using techniques such as backpropagation, by adjusting the weights of hidden nodes within the network so as to minimize the model error for known outputs given the inputs from the training data. The baseline deep neural network may have a plurality of interconnected nodes, each node having a weight vector comprised of one or more values that act to filter an input to the node and generate outputs to one or more other nodes in the network. In some implementations, the nodes can be arranged as a series of successive hidden layers between an input layer and an output layer of the network.

Depending on characteristics of the training data, the baseline deep neural network may exhibit characteristics that make it amenable to low-rank compression. For example, audio training data for keywords may result in a network whose nodes in one or more layers have a generally rank-1 dependence. Nonetheless, those nodes in the baseline deep neural network may not be constrained to rank-1 weight vectors, and so the number of parameters per node is much greater than necessary to achieve a target performance level. Accordingly, at stage 806, the process 800 generates low-rank filters that approximate the weights of each node in one or more layers of the baseline DNN. In some implementations, low-rank filters are only computed for the first hidden layer of the network.

At stage 808, the process 800 initializes a rank-constrained neural network with the low-rank filters that were generated from the one or more layers of nodes in the baseline neural network. In this way, the rank-constrained neural network can be configured with a low-rank topology that is enforced during the training of the rank-constrained neural network. At stage 810, the process 800 obtains a second set of training data (which may be the same or different than the first set of training data 802), and at stage 812 trains the rank-constrained neural network using the second set of training data. The initial low-rank topology of the filters in the rank-constrained neural network can be maintained so that the number of parameters per mode remains much smaller than in the baseline network.

Once training of the network has completed, stages 814 and 816 relate to the run-time performance of the rank-constrained neural network. The rank-constrained network may be implemented in various contexts, such as automatic speech recognition (including as a language model or keyword spotter, for example), image recognition, or other contexts. Generally, at stage 814 the rank-constrained network receives an input signal, and then predicts one or more output conditions at stage 816. In a keyword spotting system, for example, the rank-constrained network may receive raw audio feature inputs, and determine the probabilities that the input corresponds to one or more keywords.

Figure 9:
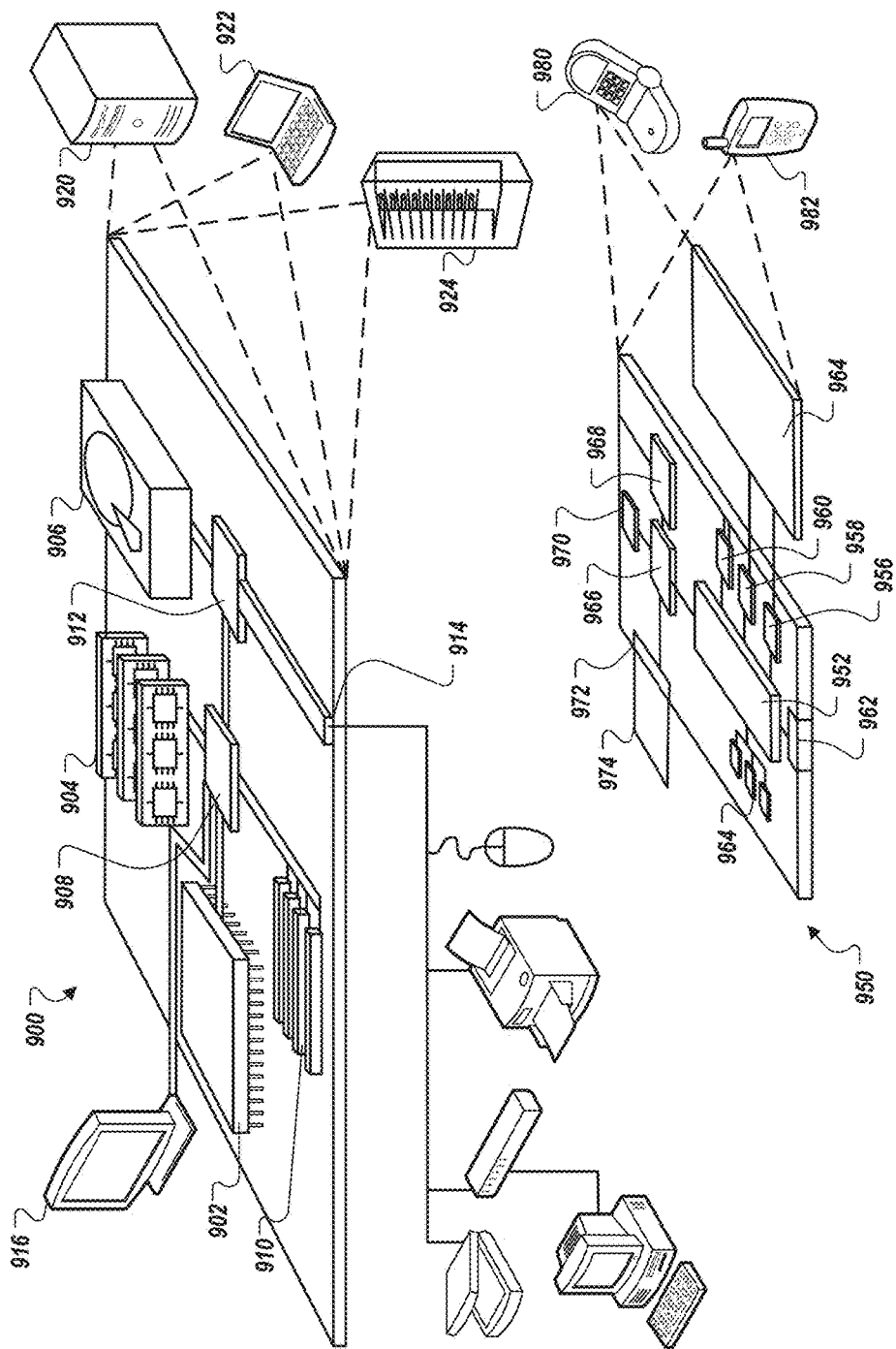
FIG. 9 depicts an example of a computing device and a mobile computing device that can be used to implement the techniques described in this specification

FIG. 9 shows an example of a computing device 900 and a mobile computing device that can be used to implement the techniques described herein. The computing device 900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this specification.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provide as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 964, the expansion memory 974, or memory on the processor 952. In some implementations, the computer program product can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 968 using a radio-frequency. In addition, short-range communication may occur, such as using a Bluetooth, WiFi, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims

What is claimed is:

1. A computer-implemented method, comprising:
   obtaining a first set of training data for training a baseline neural network, wherein the first set of training data comprises respective representations of audio signals for a first plurality of speech samples;
   training the baseline neural network using the first set of training data, the baseline neural network comprising a plurality of interconnected nodes, wherein each of the nodes comprises two or more weight values that characterize a filter for the node;
   for each node in a subset of the interconnected nodes in the baseline neural network, computing a rank-k approximation that characterizes the filter for the node using a reduced number of weight values;

obtaining a second set of training data for training a rank-constrained neural network, wherein the second set of training data comprises respective representations of audio signals for a second plurality of speech samples;

initializing a subset of nodes in the rank-constrained neural network with the rank-k approximations from the baseline neural network, the subset of nodes in the rank-constrained neural network corresponding to the subset of the interconnected nodes in the baseline neural network;

after initializing the subset of nodes in the rank-constrained neural network with the rank-k approximations, training the rank-constrained neural network using the second set of training data while maintaining a rank-k filter topology for the subset of nodes in the rank-constrained neural network;

after training the rank-constrained neural network using the second set of training data while maintaining the rank-k filter topology for the subset of nodes in the rank-constrained neural network, providing to the rank-constrained neural network a run-time input that represents a first audio signal for a first speech sample;

calculating, using the rank-constrained neural network, respective probabilities of one or more output conditions that correspond to the run-time input; and providing a recognition output for the run-time input that is determined based at least in part on the respective probabilities of the one or more output conditions that correspond to the run-time input.

2. The computer-implemented method of claim 1, wherein:

the subset of the interconnected nodes in the baseline neural network comprises nodes in a first hidden layer of the baseline neural network, to the exclusion of other nodes outside of the first hidden layer of the baseline neural network; and initializing the subset of nodes in the rank-constrained neural network comprises initializing nodes in a first hidden layer of the rank-constrained neural network with the rank-k approximations from the baseline neural network, to the exclusion of other nodes outside the first hidden layer of the rank-constrained neural network.

3. The computer-implemented method of claim 1, wherein for at least one node in the subset of the interconnected nodes in the base line neural network, computing the rank-k approximation comprises performing a single value decomposition on a weight vector of the rank-k approximation.

4. The computer-implemented method of claim 3, wherein performing the singular value decomposition on the weight vector of the rank-k approximation comprises wrapping the weight vector into a matrix.

5. The computer-implemented method of claim 1, wherein the second set of training data includes all or some of the training data from the first set of training data.

6. The computer-implemented method of claim 1, wherein providing the run-time input to the rank-constrained neural network, calculating the respective probabilities of the one or more output conditions that correspond to the run-time input, and providing the recognition output for the run-time input comprises performing an automatic speech recognition task with the trained rank-constrained neural network by predicting a likelihood that the first speech sample includes one or more words, or portions of a word, in a language.

7. The computer-implemented method of claim 1, wherein providing the run-time input to the rank-constrained neural network, calculating the respective probabilities of the one or more output conditions that correspond to the run-time input, and providing the recognition output for the run-time input comprises predicting a likelihood that the first speech sample includes one or more pre-defined keywords, or portions of a keyword, in the language.

8. The computer-implemented method of claim 1, wherein at least one of the first set of training data or the second set of training data comprises samples that each indicate, for each of n time frames, a level of an audio signal for each of m frequency channels during the time frame.

9. The computer-implemented method of claim 1, wherein the first audio signal for the first speech sample is capable of being visually represented by a two-dimensional spectrogram.

10. The computer-implemented method of claim 1, wherein the respective representations of audio signals for the first plurality of speech samples and the second plurality of speech samples each includes a plurality of values arranged in an m×n array.

11. The computer-implemented method of claim 10, wherein:

each node in the subset of the interconnected nodes in the baseline neural network is comprised only of a number of weight values that equals the product of m and n, or that equals the product of m and n plus one; and each node in the subset of nodes in the trained rank-constrained neural network is comprised only of a number of weight values that equals the sum of m and n, or that equals the sum of m and n plus one.

12. The computer-implemented method of claim 1, wherein computing the rank-k approximation comprises computing a rank-1 approximation.

13. The computer-implemented method of claim 1, further comprising performing image processing tasks with the trained rank-constrained neural network.

14. One or more non-transitory computer-readable storage media having instructions stored thereon that, when executed by one or more processors, cause performance of operations comprising:

obtaining a first set of training data for training a baseline neural network, wherein the first set of training data comprises respective representations of audio signals for a first plurality of speech samples;

training the baseline neural network using the first set of training data, the baseline neural network comprising a plurality of interconnected nodes, wherein each of the nodes comprises two or more weight values that characterize a filter for the node;

for each node in a subset of the interconnected nodes in the baseline neural network, computing a rank-k approximation that characterizes the filter for the node using a reduced number of weight values;

obtaining a second set of training data for training a rank-constrained neural network, wherein the second set of training data comprises respective representations of audio signals for a second plurality of speech samples;

initializing a subset of nodes in the rank-constrained neural network with the rank-k approximations from the baseline neural network, the subset of nodes in the rank-constrained neural network corresponding to the subset of the interconnected nodes in the baseline neural network;

after initializing the subset of nodes in the rank-constrained neural network with the rank-k approximations, training the rank-constrained neural network using the second set of training data while maintaining a rank-k filter topology for the subset of nodes in the rank-constrained neural network;

after training the rank-constrained neural network using the second set of training data while maintaining the rank-k filter topology for the subset of nodes in the rank-constrained neural network, providing to the rank-constrained neural network a run-time input that represents a first audio signal for a first speech sample;

calculating, using the rank-constrained neural network, respective probabilities of one or more output conditions that correspond to the run-time input; and providing a recognition output for the run-time input that is determined based at least in part on the respective probabilities of the one or more output conditions that correspond to the run-time input.

15. The non-transitory computer-readable storage media of claim 14, wherein:

the subset of the interconnected nodes in the baseline neural network comprises nodes in a first hidden layer of the baseline neural network, to the exclusion of other nodes outside of the first hidden layer of the baseline neural network; and initializing the subset of nodes in the rank-constrained neural network comprises initializing nodes in a first hidden layer of the rank-constrained neural network with the rank-k approximations from the baseline neural network, to the exclusion of other nodes outside the first hidden layer of the rank-constrained neural network.

16. The non-transitory computer-readable storage media of claim 14, wherein for at least one node in the subset of the interconnected nodes in the base line neural network, computing the rank-k approximation comprises performing a single value decomposition on a weight vector of the rank-k approximation.

17. The non-transitory computer-readable storage media of claim 16, wherein performing the singular value decomposition on the weight vector of the rank-k approximation comprises wrapping the weight vector into a matrix.

18. The non-transitory computer-readable storage media of claim 14, wherein the second set of training data includes all or some of the training data from the first set of training data.

19. The non-transitory computer-readable storage media of claim 14, wherein providing the run-time input to the rank-constrained neural network, calculating the respective probabilities of the one or more output conditions that correspond to the run-time input, and providing the recognition output for the run-time input comprises performing an automatic speech recognition task with the trained rank-constrained neural network by predicting a likelihood that the first speech sample includes one or more words, or portions of a word, in a language.

20. A system comprising:

one or more computers; and one or more computer-readable storage media having instructions stored thereon that, when executed by the one or more computers, cause performance of operations comprising:

obtaining a first set of training data for training a baseline neural network, wherein the first set of training data comprises respective representations of audio signals for a first plurality of speech samples;

training the baseline neural network using the first set of training data, the baseline neural network comprising a plurality of interconnected nodes, wherein each of the nodes comprises two or more weight values that characterize a filter for the node;

for each node in a subset of the interconnected nodes in the baseline neural network, computing a rank-k approximation that characterizes the filter for the node using a reduced number of weight values;

obtaining a second set of training data for training a rank-constrained neural network, wherein the second set of training data comprises respective representations of audio signals for a second plurality of speech samples;

initializing a subset of nodes in the rank-constrained neural network with the rank-k approximations from the baseline neural network, the subset of nodes in the rank-constrained neural network corresponding to the subset of the interconnected nodes in the baseline neural network;

after initializing the subset of nodes in the rank-constrained neural network with the rank-k approximations, training the rank-constrained neural network using the second set of training data while maintaining a rank-k filter topology for the subset of nodes in the rank-constrained neural network;

after training the rank-constrained neural network using the second set of training data while maintaining the rank-k filter topology for the subset of nodes in the rank-constrained neural network, providing to the rank-constrained neural network a run-time input that represents a first audio signal for a first speech sample;

calculating, using the rank-constrained neural network, respective probabilities of one or more output conditions that correspond to the run-time input; and providing a recognition output for the run-time input that is determined based at least in part on the respective probabilities of the one or more output conditions that correspond to the run-time input.

\* \* \* \* \*